United States Patent
Neary

[15] 3,650,412
[45] Mar. 21, 1972

[54] BAR STOCK FEED MECHANISM

[72] Inventor: Richard William Neary, Bromsgrove, England

[73] Assignee: Atlantis Machine Tool Developments Limited, Belbroughton, near Stourbridge, England

[22] Filed: Feb. 5, 1970

[21] Appl. No.: 9,013

[30] Foreign Application Priority Data

Feb. 7, 1969    Great Britain .......................6,639/69

[52] U.S. Cl. ...............................214/1.5, 82/2.7, 214/8.5 K
[51] Int. Cl. ...........................................................B23q 5/22
[58] Field of Search ..................214/1.1, 1.5; 83/2.7; 82/648

[56] References Cited

UNITED STATES PATENTS 2,595,522   5/1952   Harney ..............................214/1.2 X
3,147,653   9/1964   Jones, Jr. ............................214/1.4 X

FOREIGN PATENTS OR APPLICATIONS 1,024,797   4/1966   Great Britain .........................214/1.5

*Primary Examiner*—Gerald M. Forlenza
*Assistant Examiner*—Frank E. Werner
*Attorney*—Holman & Stern

[57] ABSTRACT

Mechanism for feeding bar stock to machine tools in which the feeding is effected by a linear motor. The linear motor is arranged for movement parallel to means for supporting the bar to be fed in alignment with the headstock of the machine tool, the movable part of the motor being connected to a pusher arranged to bear against a bar supported on the means.

2 Claims, 3 Drawing Figures

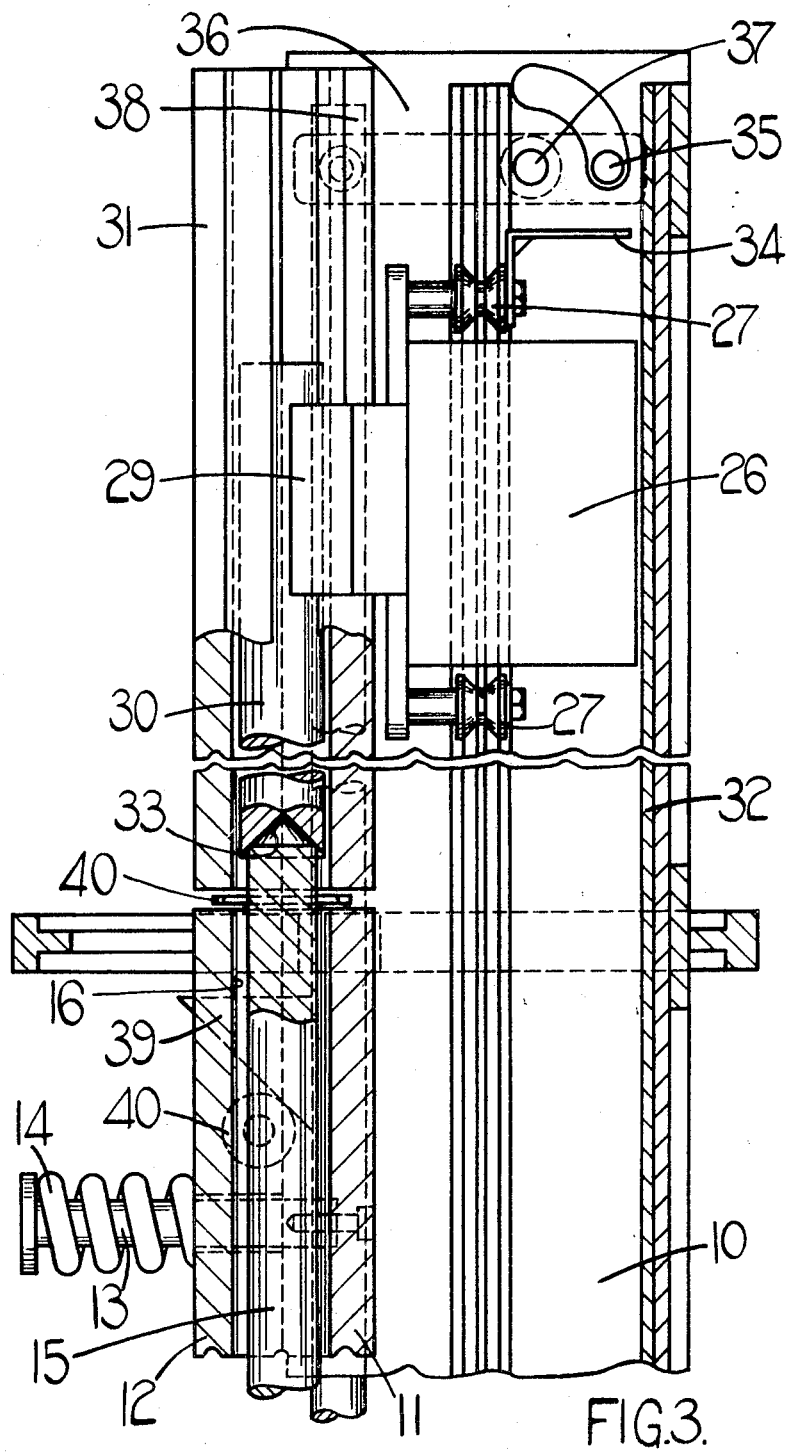

BAR STOCK FEED MECHANISM

This invention relates to bar stock feed mechanism for machine tools, and has for its object to provide such mechanism in a simple and convenient form.

Feed mechanism according to the invention comprises the combination of means for supporting the bar for guided lengthwise movement, a linear motor arranged for movement parallel to the permitted movement of a bar supported by said means, and a pusher connected to the movable part of the motor and arranged to bear against a bar supported on said means.

Figure 1:
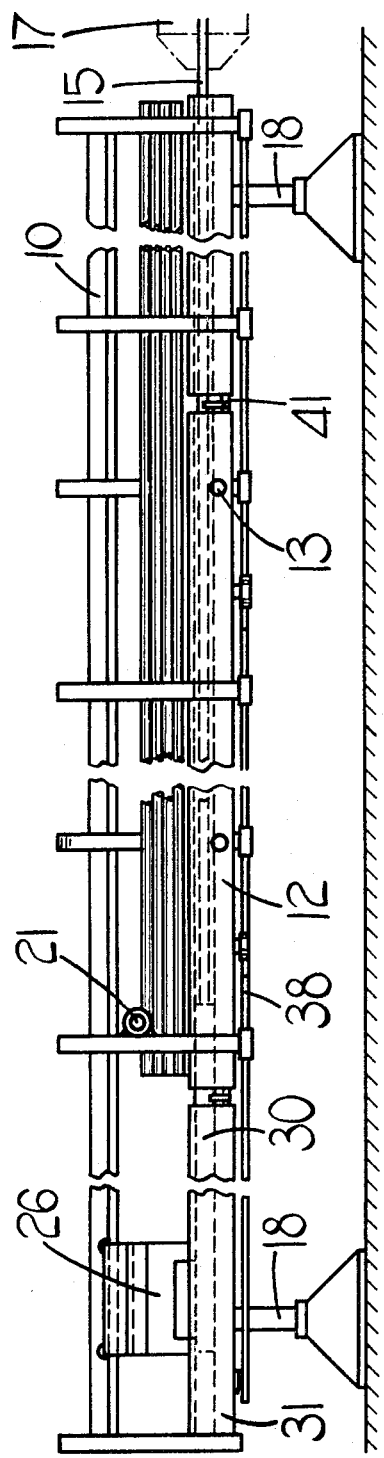
Figure 2:
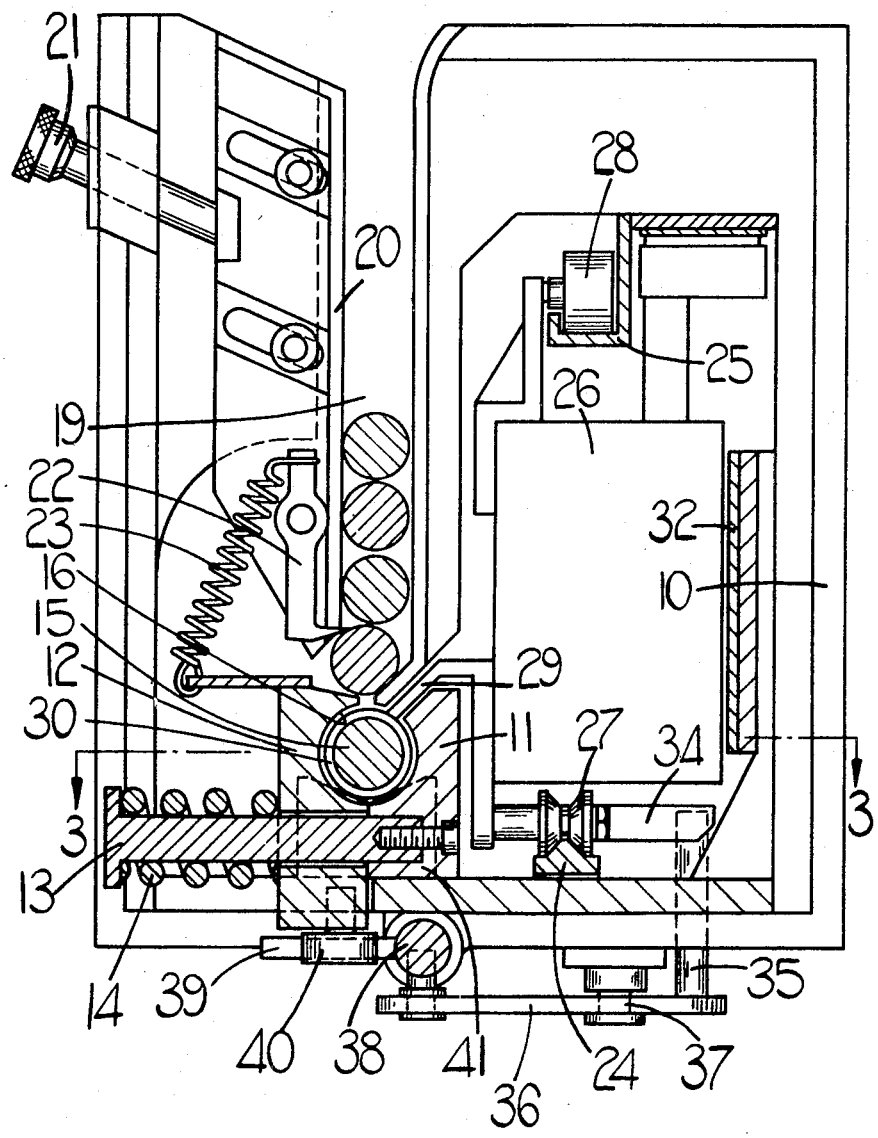

In the accompanying drawings
FIG. 1 is a side view of an example of the invention,
FIG. 2 is a cross-sectional view of FIG. 1 to an enlarged scale, and,
FIG. 3 is a section on the line 3—3 of FIG. 2.

Referring to the drawings there is provided a body part 10 on which are mounted a plurality of similarly spaced aligned supports for a bar to be fed. Each support is constituted by a fixed part 11 mounted on the body part 10 and a movable part 12 which is slidable along the posts 13 secured to the part 11 against the action of coiled compression springs 14. The parts 11 and 12 are complementarily grooved as shown, to provide the equivalent of a longitudinally extending cylindrical cavity 16 to receive the bar 15 to be fed. The cavity 16 can be aligned with the headstock 17 of the machine tool with which the feed mechanism is associated, and for this purpose the body 10 is mounted upon vertically adjustable pedestals 18.

The portion of the body part 10, except for the end portion remote from the machine tool, is shaped to provide a vertically extending magazine 19 for storing the bars 15 prior to their being loaded into the cavity 16. The one wall 20 of the magazine is adjustable by a screw 21 to vary the width of the magazine to accommodate bars of different diameters. Moreover, on the adjustable wall 20 is a detent 22, which is connected by a spring 23 to the movable part 12 of the support, and the arrangement is such that as the part 12 moves away from the part 11 against the action of the springs 14, the lowermost bar in the magazine 19 will enter the cavity 16, whilst the detent 22 will be rocked anticlockwise as viewed in FIG. 2, to hold back all but the lowermost bar 15 until the support is again closed.

On the body 10 and extending parallel to the cavities 16 in the plurality of supports is a lower track 24 and an upper track 25, which serve to guide the movable part 26 of a linear motor. The part 26 carries a pair of rollers 27 engaging the track 24, and a further roller 28 engaging track 25. Moreover, connected to the part 26 is a blade 29 which extends through a slot defined between the two parts 11, 12 into the cavity 16 and has secured to its outer end a pusher rod 30 disposed within the cavity 16 or an extension thereof formed in a block 31 secured to the body 10 at the end remote from the machine tool, depending upon the position of the part 26 on the tracks 24, 25 which extend throughout the full length of the body part 10. The fixed part of the linear motor comprises an aluminum or other strip 32 secured to the body part 10 and extending lengthwise parallel to the tracks 24, 25 and to the cavity 16. The pusher rod 30 has a conical depression 33 at its end presented to the machine tool for engagement with the end of a bar 15.

Assuming that the part 26 of the motor is at the end of its travel, away from the headstock 17, so that the pusher rod 30 is accommodated within the extension of the cavity 16 formed in the block 31, and that the lowermost bar 15 from the magazine has been fed into the cavity 16, then the motor is energized to move it towards the headstock 17 along the tracks 24, 25. As a result, the rod 30 engages the bar and pushes it into the headstock 17 until the bar contacts a stop of known type associated with the machine. The machine then grips the bar in known manner, and at the same time the motor is deenergized. At the end of the machining operation the portion of the bar which has been worked is cut off and the clamping mechanism of the machine opens at the same time, actuating a switch to reenergize the motor. The linear motor thus moves again towards the headstock 17, thus feeding another length of the bar to the machine and the process is repeated until the bar is expanded. When the bar is expended the part 26 of the linear motor will have reached a position to actuate a return switch (not shown) whereby the motor will be reversed to return it to the outer ends of the tracks 24, 25. On reaching the end of the tracks remote from the headstock an abutment 34 carried by the part 26 strikes an upstanding pin 35 on a lever 36 pivoted on the body part 10 at 37 and pivotally connected at its opposite end to a longitudinally extending rod 38. On the rod 38 are secured a plurality of spaced triangular cams 39 which are arranged to coact with rollers 40 carried by the parts 12 of the supports. As a result, the momentum of the part 26 will cause the lever 36 to be rocked about its pivot 37 and thereby move the rod 38 towards the headstock 17. The effect of this movement is to cause the plurality of cams 39 to coact with the rollers 40 in moving the parts 12 along the posts 13 away from the parts 11, thereby permitting the lowermost bar to enter the cavities in the supports. The parts 12 will be returned quickly by the action of the springs 13 and at the same time the linear motor will be reversed to initiate the feed of the next bar and the cycle is repeated.

Between the adjacent supports blocks 41 are secured to the body part 10 to support a bar whilst the two parts 11, 12 are separated; these blocks 41 conventionally having a V-shaped groove in their upper surface to lock the bar.

I claim:
1. Mechanism for feeding bar stock to machine tools comprising in combination means including a plurality of spaced aligned supports for supporting the bar for guided lengthwise movement, each of said supports having a fixed part and a movable part, a spring resisting movement of said movable part away from the fixed part, a cavity defined between the two parts, a linear motor, guide tracks guiding a movable part of said motor for movement parallel to the cavities in the supports, a pusher rod movable through the cavities, means extending between the two parts of the supports connecting the pusher rod to the movable part of the motor said pusher rod bearing against a part supported within the cavities, and a magazine disposed above the supports and arranged to feed the lowermost bar therein into the cavities in the supports as the two parts of the supports are separated.

2. Mechanism for feeding bar stock to a machine tool as claimed in claim 1, including cam means operable to move the movable part of the support away from the fixed part, and means for actuating said cam means said means including an abutment operable by a movable part of the linear motor at the end of its travel away from the machine tool.

* * * * *